Figure 1:
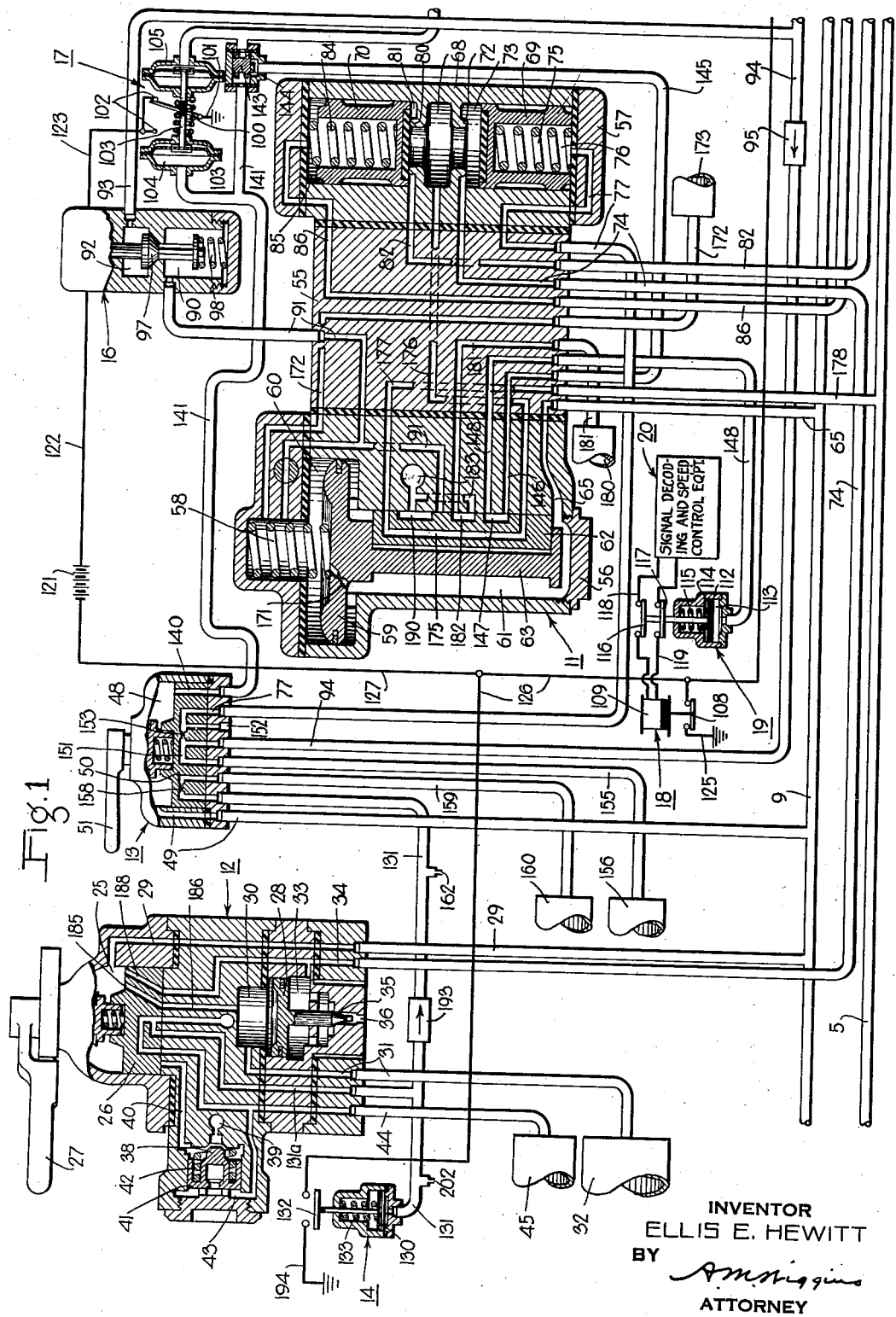

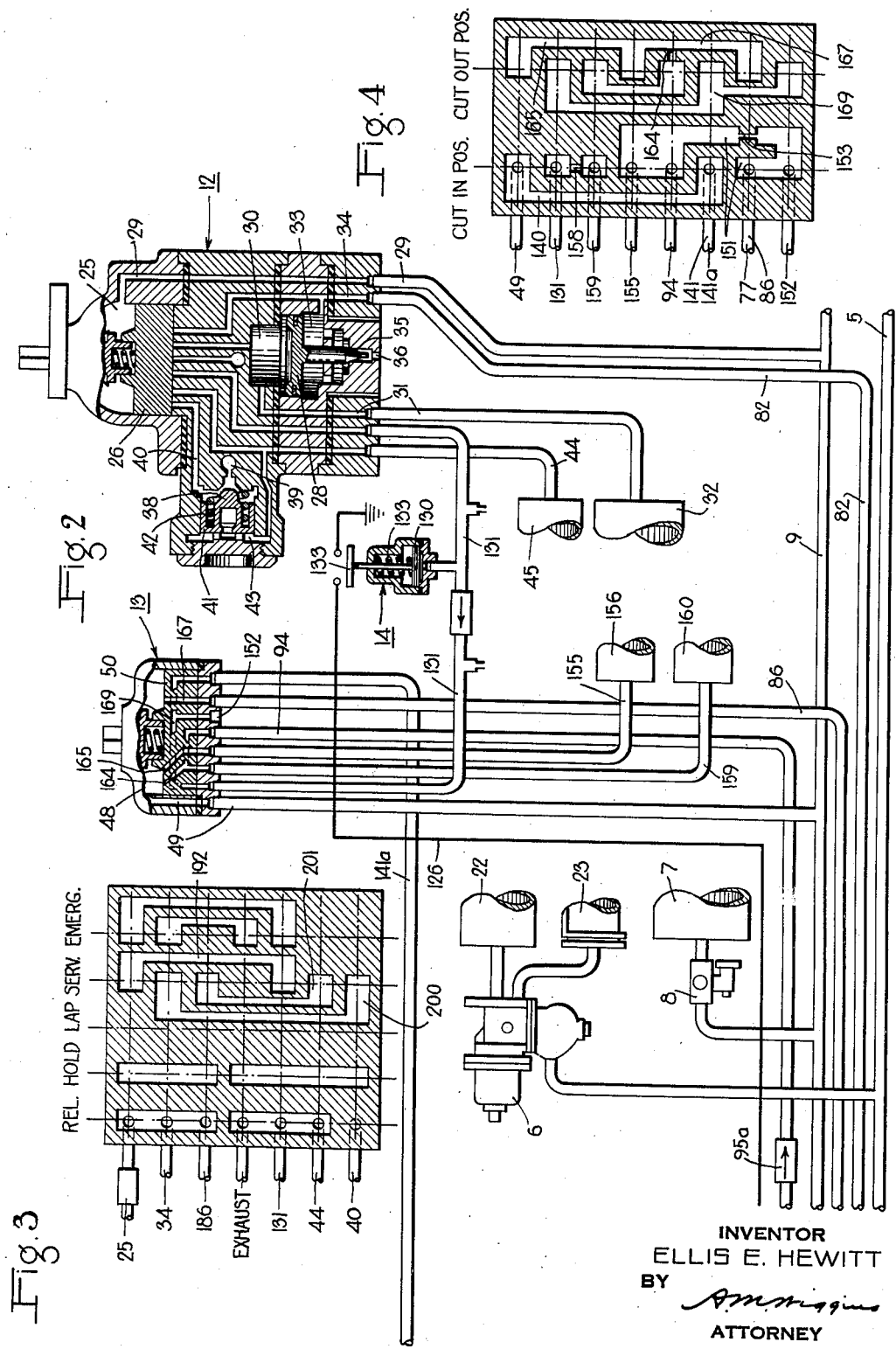

Patented Sept. 26, 1939

2,173,941

UNITED STATES PATENT OFFICE 2,173,941

AUTOMATIC TRAIN CONTROL

Ellis E. Hewitt, Edgewood, Pa., assignor to The Westinghouse Air Brake Company, Wilmerding, Pa., a corporation of Pennsylvania Application February 26, 1938, Serial No. 192,813

21 Claims. (Cl. 303—18)

This invention relates to fluid pressure brakes and train control systems, and particularly to a train control equipment for a vehicle having double end brake controlling apparatus and adapted to be operated at one time as a single traction car and at another time as a unit in a train.

Unusual traction service problems have been encountered in at least one large metropolitan area, where the main business and industrial distict is widely separated from an extensive residential district by a large body of water, across which a long bridge has been constructed to carry the heavy traffic moving from one district to the other. It is necessary to maintain street railway service over the various routes leading through each of the separate districts of the metropolitan area, which routes converge at the approaches of the bridge, but for various practical reasons it is undesirable to operate single street cars over the long bridge.

It has accordingly been proposed to design and equip the street cars so that they can be run in the usual manner over assigned routes in one district, coupled into trains of about ten units after having reached the approach to the bridge, and then driven over the bridge under control of the leading car, after which the cars can be uncoupled and again operated separately over assigned routes in the other districts. In order to insure safe operation of the train of vehicles over the bridge at maximum speed, it is proposed to adapt the cars to be run subject to automatic train control while crossing the bridge, for which purpose it is desirable to include the bridge and its approaches in a train control zone, and to provide the cars with train control apparatus operative in response to an adverse signal indication within the zone for effecting an emergency application of the brakes throughout the train, unless the motorman operating the leading car acts within a certain interval of time to cause a service application.

One object of my invention is to provide, on a vehicle, an automatic train control equipment and a brake equipment of the double end type, which equipment is adapted to be employed in the above class of service, and by means of which the car is adapted to be operated from either end as an individual traction vehicle at one time, and as a unit in a train of cars at another time.

Another object of the invention is to provide fluid pressure brake apparatus of the double end control type having associated therewith an automatic train control equipment which is operative to effect an emergency application of the brakes, either in response to an adverse traffic signal or when the operator changes control of the vehicle from one end to the other, unless the operator has already effected a service application of the brakes.

A further object of the invention is to provide a fluid pressure brake and train control equipment of the above type, in which is included cut-out valve devices by means of which the operator may at one time render the said equipment controllable from one of the brake valves, and may at another time isolate the brake pipe and triple valve apparatus from the rest of the equipment on that car, so that the car may then be hauled as one unit in a train with the brakes controllable according to variations in brake pipe pressure communicated from the car at the head end.

It is still another object to provide, on a vehicle equipper with a fluid pressure brake apparatus and an electrically controlled automatic train control equipment, in which the brake apparatus includes a brake valve and a manually operable cut-off valve device at each end of the vehicle, electrical suppression means controlled by either brake valve device for preventing operation of the train control apparatus under one condition, and fluid pressure suppression means controlled by cooperation of one of the brake valves with the associated cut-off valve device for maintaining the train control apparatus ineffective under another condition.

Other objects and advantages of my invention will appear in the following detailed description thereof, taken in connection with the accompanying drawings, wherein:

Figs. 1 and 2, taken together, constitute a diagrammatic view, mainly in section, of a fluid pressure brake and automatic train control equipment constructed in accordance with the invention; and Figs. 3 and 4 are diagrammatic views showing the port connections of the brake valve and cut-out valve devices, respectively.

Referring to Figs. 1 and 2 of the drawings, the combined fluid pressure brake and train control equipment for a single vehicle comprises a brake pipe 5, a brake controlling or triple valve device 6, a main reservoir 7, from which fluid under pressure is supplied by operation of a feed valve device 8 to a supply pipe 9, an application valve device 11, and at each end of the vehicle, a brake valve device 12, a cut-off valve device 13, and a suppression switch 14. The automatic train control equipment further includes a magnet valve device 16, a directional relay device 17, a timing relay device 18, a release switch 19 and suitable signal decoding and speed control equipment as shown in outline form at 20.

The brake controlling valve device 6, which is illustrated in outline form in Fig. 2 of the drawings, may be of any suitable type operative upon a reduction in the pressure of fluid in the brake pipe 5 to supply fluid under pressure from the usual auxiliary reservoir 22 to the brake cylinder 23 for effecting an application of the brakes.

The brake valve device 12, one at each of the opposite ends of the vehicle, may be of any desired type, and as illustrated in the drawings is similar in construction to the brake valve device shown and described in the United States Patent No. 1,027,938, to W. V. Turner. Each of the brake valve devices 12 comprises a casing having a chamber 25 communicating through a passage and pipe 29 with pipe 9 and having mounted therein a rotary valve 26, which is adapted to be operated through the medium of a handle 27 of the removable type adapted to be fitted on to the brake valve device at the operative end of the vehicle as indicated in Fig. 1. Each of the brake valve devices 12 is provided with an equalizing discharge valve mechanism comprising an equalizing piston 28 having on one side a chamber 30 communicating through a passage and pipe 31 with an equalizing reservoir 32, and on the other side a chamber 33 connected to a brake pipe passage 34. The piston 28 is adapted to operate a brake pipe discharge valve 35, which controls communication between the chamber 33 and an exhaust port 36. In addition to the discharge valve mechanism each brake valve device 12 includes a service reduction valve device operative when the brake valve device is in service position to effect a quick initial reduction in brake pipe pressure. The service reduction valve device comprises a normally open valve 38 controlling communication between an exhaust port 39 and a brake pipe passage 40 leading to the seat of the rotary valve 26, and a piston 41 adapted to operate the valve 38 and subject to the opposing pressures of a spring 42 and of fluid in a chamber 43 which communicates through a passage and pipe 44 with a reduction limiting reservoir 45.

The cut-out valve device 13, associated with each brake valve device 12, comprises a casing having a valve chamber 48 communicating through a passage and pipe 49 with the supply pipe 9, within which chamber is disposed a rotary valve 50 adapted to be operated through the medium of a removable handle 51, which, like the brake valve handle 27, is applied to the cut-off valve at the operating end of the vehicle.

According to the invention, the application valve device 11 comprises a pipe bracket 55, which has secured to one side thereof an application portion 56 and to the other side a selector portion 57. Operatively mounted within a bore in the application portion 56 is an application piston 59 having at one side a chamber 60 which contains a biasing spring 58, and at the opposite side a valve chamber 61, within which is disposed an application slide valve 62 that is operable by the piston 59 through the medium of a stem 63. The chamber 61 is connected through a passage and pipe 65 with the supply pipe 9.

Formed in the selector portion 57 is a brake pipe chamber 68 communicating with a pair of similar bores having slidably mounted therein two remote-controlled cut-off valve pistons 69 and 70, respectively. The valve piston 69 is engageable with an annular seat 72 for controlling communication between the chamber 68 and a chamber 73, which is connected through a passage and pipe 74 with the passage 34 in the brake valve device 12 shown in Fig. 1 of the drawings. The valve piston 69 is urged toward seated position by the force of a spring 75 which is disposed in a chamber 76 formed at the side of the valve piston opposite the chamber 73 and communicating through a passage and pipe 77 with a port in the seat of the rotary valve 50 in the cut-off valve device 13 shown in Fig. 1.

Similarly, the other valve piston 70 is adapted to engage an annular seat 80 for controlling communication between the chamber 68 and a chamber 81, which communicates through a passage and pipe 82 with the passage 34 in the brake valve device 12 located at the other end of the vehicle as shown in Fig. 2 of the drawings. For biasing the valve piston 70 toward the seat 80 there is provided a spring 84 which is disposed in a chamber 85, said chamber communicating through a passage and pipe 86 with a port in the seat of the rotary valve 50 in the cut-off valve device 13 shown in Fig. 2.

The magnet valve device 16, one of the electrical elements of the train control and brake equipment, comprises a casing which has formed therein a chamber 90 communicating through a pipe and passage 91 with the piston chamber 60 in the application valve device 11, and a valve chamber 92 connected through a pipe 93 to a pipe 94, which leads in one direction through a check valve 95 to a port in the rotary valve seat in the cut-off valve device 13 shown in Fig. 1, and in the other direction through a similar check valve 95a to the cut-off valve device shown in Fig. 2 of the drawings. A release valve 97 is provided for controlling communication from the chamber 90 to the chamber 92, which valve is adapted to be maintained in seated position by an electromagnet disposed in the upper part of the device 16, and is urged away from its seat by the force of a spring 98 in the chamber 90.

The directional relay device 17, shown diagrammatically in Fig. 1, comprises a contact member 100, which is connected to and operatively mounted on a grounded conducting member 101, and which contact member is movable into engagement with either one of a pair of contact elements 102. For operating the contact member 100 there is provided a rod 103 insulated from the contact member 100, which is adapted to be actuated by fluid pressure responsive diaphragms, mounted within diaphragm casings 104 and 105. Biasing means may be provided for maintaining the contact member 100 in an intermediate position, out of contact with both contacts 102, when neither of the diaphragm casings is supplied with fluid under pressure.

The timing relay device 18, the release switch 19 and the signal decoding and speed control equipment 20 are cooperative to control a circuit for energizing the electromagnet of the magnet valve device 16. The timing relay 18 comprises a contact member 108, which is biased downwardly toward a circuit breaking position and is adapted to be moved to circuit closing position as shown in the drawings upon energization of a magnet winding 109. The timing relay is of the slow or delayed pick-up type, so that when the winding thereof is initially supplied with current, a predetermined interval will elapse before the contact member 108 is lifted into circuit-closing position.

The release switch 19, as will hereinafter be more fully explained, is provided for preventing a premature release of the brakes following an automatic train control application, and comprises a cylinder 112 having a chamber 113 adapted to be charged with fluid under pressure, and a piston 114 subject to the opposing pressures of a biasing spring 115 and the fluid in the chamber 113 for maintaining a pair of contact members 116 and 117 in circuit closing position as illustrated in Fig. 1. In this position the contact members complete a circuit through which current is supplied for energizing the magnet 109 of the timing relay device 18, the circuit leading from the positive terminal of a suitable source of electrical energy in the control equipment 20 through a conductor 118 and member 116, the magnet coil 109, and return wire 119 and member 117 to the negative terminal of the source of electric current.

In order to avoid unnecessary complication of the drawings, the signal decoding and speed control equipment 20 is illustrated only in outline form in Fig. 1, since this equipment may be of any suitable construction and does not of itself form part of my invention. It will be understood that the equipment 20 is normally operative to supply energizing current to the coil 109 of the timing relay device 18 during operation of the vehicle, and functions to cut off this current supply in response to an adverse traffic or speed signal communicated from the track while the vehicle is within the train control zone.

While the timing relay 18 is thus energized and the directional relay 17 is in circuit closing position, a circuit is completed for energizing the magnet of the magnet valve device 16, which circuit includes a battery 121, a wire 122 connecting the positive terminal of the battery to the magnet of the device 16, a wire 123, one of the contact elements 102, the contact member 100 and grounded conductor 101, a similarly grounded conductor 125 adjacent the timing relay device 18, the contact member 108, a wire 126, and a wire 127 leading to the negative terminal of the battery 121.

The suppression switch device 14, which is associated with each brake valve device 12 at opposite ends of the vehicle, comprises a casing having operatively mounted therein a piston 130 which is adapted to be actuated by fluid under pressure supplied through a pipe 131 for moving a contact member 132 into a circuit-closing position against the opposing force of a spring 133, which is provided for normally maintaining the contact member in circuit opening position as shown in the drawings.

In order to explain the operation of the automatic train control equipment, it will be assumed that the car is at first intended to be operated as a single vehicle or as the leading vehicle in a train and that the brake valve device 12 and cut-off valve device 13 shown in Fig. 1 of the drawings are at the front or controlling end of the car. It will be noted that the rear brake valve device 12 shown in Fig. 2 is left in lap position and the associated cut-off valve device 13 in cut-out position, while the brake valve device 12 shown in Fig. 1 is supplied with the operating handle 27 and the cut-out valve device 13 adjacent thereto has the operating handle 51 applied thereto.

Fluid under pressure supplied in the usual manner to the main reservoir 7 is delivered therefrom by operation of the feed valve device 8 at the desired pressure to the supply pipe 9, from which fluid under pressure is supplied through the pipe 49 and passage 49 to the rotary valve chamber 48. The cut-out valve 13 being in cut-in position, fluid under pressure flows from valve chamber 48 through a port 140 in the rotary valve 50 and a pipe 141 to the diaphragm casing 104 in the directional relay device 17. The rod 103 is thereby actuated to move the contact member 100 into engagement with the right hand contact element 102 as shown in Fig. 1.

Fluid under pressure supplied to the pipe 141 also flows therefrom through a branch pipe 141a to one face of a double check valve 143, which is then positioned as shown in Fig. 1 to permit fluid under pressure to flow through a check valve passage 144 and a pipe 145 and passage 146 to the seat of the application slide valve 62 of the application valve device 11. Assuming that the application piston 59 and slide valve 62 are maintained in the normal position under the force of the spring 58 as shown in the drawings, fluid under pressure is thus supplied from the passage 146 through a cavity 147 in the slide valve and a passage and pipe 148 to the chamber 113 within the release switch device 19, so that the piston 114 therein is urged upwardly to maintain the contact members 116 and 117 in circuit closing position.

It will thus be apparent that, with the directional relay device 17 held in a circuit-closing position and with the timing relay device 18 likewise held in circuit-closing position, due to the energizing current normally supplied from the control equipment 20, the magnet of the magnet valve device 16 is maintained energized by current supplied from the battery 121 through the circuit hereinbefore described, so that the valve 97 is maintained seated against the force of the spring 98.

Referring again to the cut-out valve device 13 at the head end of the vehicle, with the rotary valve 50 in cut-in position as shown in Fig. 1, the port and pipe 77, which communicate with the chamber 76 of the application valve device 11, are connected with the atmosphere by way of a cavity 151 in the rotary valve and an atmospheric exhaust port 152. The cavity 151 also communicates through a restricted portion 153 with the pipe 94 and through a pipe 155 with a cut-in delay reservoir 156, said reservoir and pipe 94 being thereby connected together and with the atmosphere as shown in the drawings. Similarly, a restricted passage 158 in the rotary valve 50 is at this time adapted to afford communication between a pipe 159 leading to a cut-out reservoir 160 and the pipe 131, which is provided with a restricted atmospheric outlet 162.

As shown in Fig. 2 of the drawings, with the cut-out valve device 13 at the rear or non-operative end of the vehicle in cut-out position, fluid under pressure supplied by way of the pipe 9 and the pipe and passage 49 to the valve chamber 48 flows through a restricted passage 164 in the rotary valve 50 to the pipe 159 and cut-out delay reservoir 160, and also flows into and charges the portion of the pipe 94 between the rotary valve and the check valve 95a, the check valve 95a preventing the flow of fluid under pressure from the portion of the pipe 94 at the right of the check valve to the portion of pipe 94 at the left. With the rear rotary valve 50 in cut-out position, another passage 165 therein provides communication through which fluid under pressure flows from the valve chamber 48 to the pipe 155 and the cut-in delay reservoir 156, while a similar passage 167 in the rotary valve connects the valve chamber 48 to the pipe 86, so that fluid under pressure is supplied to the chamber 85 above the valve piston 70 associated with the application valve device 11, as shown in Fig. 1. Another passage 169 in the rotary valve 50 shown in Fig. 2 at this time connects the atmospheric exhaust port 152 to the pipe 131, and also to a pipe 141a which leads to the diaphragm casing 105 and to the right-hand face of the double check valve 143 shown in Fig. 1 of the drawings.

Referring again to Fig. 1 of the drawings, fluid under pressure supplied to the pipe 9 flows therefrom through the pipe and passage 65 to the valve chamber 61 of the application valve device 11, and thence flows through a restricted port 171 formed in the application piston 59 to the piston chamber 60, thereby charging the chamber 60 with fluid at the same pressure as that in the valve chamber 61. Fluid under pressure is also supplied from the chamber 60 through a passage and pipe 172 to a volume reservoir 173, and through the passage and pipe 91 to the chamber 90 within the magnet valve device 16, it being remembered that the valve 97 is at this time maintained seated. Since the fluid pressures acting on opposite sides of the application piston 59 are thus equal, the piston and application slide valve 62 are held in the normal position as shown in Fig. 1 by the force of the spring 58, in which position a passage 175 in the slide valve registers with a passage 176 communicating with the brake pipe chamber 68, and a passage 177 connected through a pipe 178 with the brake pipe 5. The application slide valve 62 in its normal position also maintains communication between a stop reservoir 180 and the atmosphere by way of a pipe and passage 181, a cavity 182 in the slide valve and an atmospheric exhaust port 183.

The brake valve device 12 shown in Fig. 1 having been disposed in release position, fluid under pressure supplied from the pipe 9 to the rotary valve chamber 25 flows therefrom through a port 185 in the rotary valve 26 and a passage 186 to the equalizing piston chamber 30, and thence through passage and pipe 31 to the equalizing reservoir 32. Fluid under pressure is also supplied from the valve chamber 25 through a port 188 in the rotary valve to the passage 34, and thence flows through the pipe 74, passage 74 in the application valve device 11, to the chamber 73 above the valve piston 69, which is thereby moved downwardly and away from the seat 72 for permitting the supply of fluid under pressure through the chamber 68, the passage 176, the passage 175 in the slide valve 62, and the passage 177 and pipe 178 to the brake pipe 5. It will be understood that the triple valve device 6 is operative in the usual manner when in release position to supply fluid under pressure from the brake pipe 5 to the auxiliary reservoir 22, while the brake cylinder 23 is connected to the atmosphere so that the brakes on the vehicle are released.

It will be understood that, when the various transit vehicles having the equipment being described are coupled into a train to be controlled from the leading vehicle while operating in the train control zone, the supply pipe 9 and the brake pipe 5 shown in the drawings will extend throughout the train, any suitable coupling means, not shown, being employed for connecting the pipes between adjacent cars. While the fluid pressure equipment on the leading or control vehicle in the train is being charged as just explained, the fluid pressure brake equipments including triple valve devices and auxiliary reservoirs on the trailing cars are also charged with fluid under pressure by way of the brake pipe, the brake valve and train control apparatus on such cars having been rendered inoperative, however, as will hereinafter be explained.

Considering the train control and braking equipment shown in Figs. 1 and 2 to be on the leading car in the train and conditioned for operation with the brakes controllable by means of the brake valve device 12 in Fig. 1, if an adverse signal indication is now communicated to the signal decoding and speed control equipment 20, that equipment becomes operative to cut off the supply of current to the timing relay magnet 109 in the device 18, and at the same time to actuate a cab signal means, not illustrated, for warning the engineer. Assuming at this time that the engineer does not act in response to the warning signal, the timing relay device 18 after a predetermined interval becomes operative to move the contact member 108 downwardly into circuit breaking position, thereby cutting off further supply of energizing current from the battery 121 to the magnet in the magnet valve device 16. On deenergization of that magnet, the spring 98 lifts the valve 97 away from its seat, so that fluid under pressure is permitted to flow from the application piston chamber 60 in the application valve device 11 through the passage and pipe 91, chamber 90, past the unseated valve 97, and thence through the valve chamber 92, and pipe 93 to the pipe 94. Fluid under pressure thus supplied to that portion of the pipe 94 at the left of check valve 95a is prevented from flowing therefrom past the check valve 95a in Fig. 2 by reason of the pressure of fluid maintained in the portion of pipe 94 at the right of said check valve, so that fluid under pressure thus supplied to the pipe 94 at the left of check valve 95a flows only past the check valve 95 to the portion of pipe 94 at the left of check valve 95, and thence through the passage 151 in the rotary valve of the cut-off valve device 13 and through the pipe 155 to the cut-in delay reservoir 156. Fluid under pressure thus supplied to pipe 94 also flows to atmosphere by way of the rotary valve passage 151 and the restricted flow portion 153 to the atmospheric exhaust port 152.

Fluid under pressure thus vented from the application piston chamber 60 flows therefrom at a faster rate than that of supply of fluid from the valve chamber 61 through the restricted passage 171 in the piston 69, and on a predetermined reduction in the fluid pressure in the piston chamber 60, the piston 59 and the application slide valve 62 are shifted upwardly into application position, thereby cutting off communication between the brake pipe supply passages 176 and 177 and bringing the cavity 182 into registration with the passage 181 and the passage 91 communicating with the piston chamber 60. At the same time, another cavity 190 in the application slide valve establishes communication between the brake pipe passage 170 and the atmospheric exhaust port 183, so that fluid under pressure is vented at an emergency rate from the brake pipe 5 by way of the pipe and passage 178, the cavity 190 and the exhaust port 183, with the result that the triple valve device 6 is operated in the well known manner to cause an emergency application of the brakes. The triple valve devices on the trailing vehicles likewise respond to the emergency reduction in the fluid pressure in the brake pipe 5 as effected by operation of the train control apparatus on the leading vehicle as just explained.

With the application slide valve 62 in application position, the cavity 147 therein connects the passage 148 to the atmospheric exhaust port 183 for permitting fluid under pressure in the piston chamber 113 of the release switch device 19 to be vented to the atmosphere, and the spring 115 is thereby enabled to move the contact members 116 and 117 into circuit opening position. This operation of the release switch device 19 avoids any possibility of an undesired automatic release of the brakes being effected without any action on the part of the motorman, such as might occur if a favorable change in traffic signals were to render the signal decoding equipment 29 effective to supply current for energizing the timing relay 18.

In order to effect the release of the brakes following an automatic emergency application due to operation of the train control apparatus as just explained, the motorman must move the handle 27 of the forward brake valve device 12 to service position, for initially establishing communication from the rotary valve chamber 25 through a rotary valve passage 192 and a passage 131a to the pipe 131, as is shown in Fig. 3 of the drawings. While the brake valve device 12 is in service position, fluid under pressure is thus supplied from the rotary valve chamber 25 through passage 192 and the passage 131a and pipe 131 to the lower face of the piston 130 in the depression switch device 14, and is also supplied past a check valve 193 in the pipe 131, and through the passage 158 in the rotary valve 50 of the cut-off valve device 13 and the pipe 159 to the cut-out delay reservoir 160, thereby charging the reservoir with fluid under pressure.

Upon a predetermined increase in the pressure of fluid thus supplied to the pipe 131, the depression switch piston 130 is forced upwardly against the force of the spring 133 to move the contact member 132 into circuit-closing position for causing current to be again supplied from the battery 121 to the magnet valve device 16 through a circuit which includes the wire 122, the magnet in the device 16, the wire 123, the contact element 102 and contact member 100, the grounded conductor 101, a grounded conductor 194, the contact member 132 and wires 126 and 127 leading to the negative terminal of the battery.

When the valve 97 of the magnet valve device 16 has thereby been returned to its seat, further flow of fluid under pressure from the piston chamber 60 in the application valve device 11 is cut off, and since fluid under pressure continues to flow from the application valve chamber 61 through the restricted passage 171 in the piston 59 to the piston chamber 60, fluid under pressure is then supplied from the piston chamber through the passage and pipe 172 to the volume reservoir 173, and also by way of the passage 91, the cavity 182 in the application slide valve, and passage and pipe 181 to the stop reservoir 180. The stop reservoir 180 is of such a volume as to require the flow of fluid under pressure thereto at the rate determined by the restricted passage 171 for a predetermined interval before the brakes can be released. After the pressure of fluid in the piston chamber 60 and in the reservoirs 173 and 180 connected thereto has been built up sufficiently, the spring 58 becomes effective to move the piston 59 and the application slide valve 62 downwardly to the normal position as shown in Fig. 1 of the drawings, and with the passages 146 and 148 again connected by way of the cavity 147, fluid under pressure is supplied to the piston chamber 113 in the release switch device 19 for causing movement of the contact members 116 and 117 into circuit-closing position.

Assuming that the track and speed signal conditions are now clear, the signal decoding equipment 29 thus becomes effective to supply current to the magnet winding 109 of the timing relay device 18. After the usual delay interval, the contact member 108 is then lifted into circuit-closing position for maintaining the magnet of the magnet valve device 16 energized as already explained.

The brake valve 12 shown in Fig. 1 may then be moved to release position, for charging the brake pipe 5 with fluid under pressure in the manner hereinbefore explained, thereby effecting the release of the brakes.

It should be understood that the operation of the train control equipment to effect an emergency application of the brakes as just described is provided as a safety feature, and is not intended to become effective after each adverse traffic signal condition. The motorman on the leading car in the train is expected normally to retain control of the brakes at all times, even when an adverse signal condition is encountered, in which case he should act promptly to effect a service application of the brakes in order to suppress operation of the train control portion of the equipment. In order to suppress a train control emergency application of the brakes, after he has been warned of an adverse track signal condition the motorman should move the brake valve device 12 at the operating end of the vehicle to service position, before sufficient time has elapsed for operation of the timing relay device 18 to move the contact member 108 to circuit-opening position.

With the brake valve device 12 in service position, fluid under pressure is supplied from the valve chamber 25 therein through the passage 192 in the rotary valve to the pipe 131 for causing operation of the suppression switch 14 to move the contact member 132 to circuit-closing position as hereinbefore explained, so that the magnet valve device 16 is maintained in the normal position shown in Fig. 1. At the same time, the cavity 200 in the rotary valve 26 establishes communication between the passages 34 and 40, so that fluid under pressure is vented from the brake pipe 5 by way of the hereinbefore described communication in the application valve device 11, which of course remains in the normal position as shown in Fig. 1 at this time, and then through the pipe 74, passage 34, the cavity 200, passage 40, and past the valve 38 to the atmospheric exhaust port 39, thereby quickly initiating the reduction in brake pipe pressure.

Meanwhile, fluid under pressure is vented from the equalizing reservoir 32 and the equalizing piston chamber 30 by way of the passage 186, a cavity 201 in the rotary valve, and the passage 44 to the reduction limiting reservoir 45 and also to the chamber 43. The equalizing piston 28 is operated in the usual manner in response to the reduction in the pressure in the chamber 30 to open the discharge valve 35 for continuing the reduction in brake pipe pressure at a service rate after the piston 41 is operated on a predetermined increase in fluid pressure in the chamber 43 to seat the valve 38.

When the pressure of fluid in the brake pipe 5 has thus been reduced sufficiently to cause the required service application of the brakes, and after a favorable train control signal is indicated, the brake valve device 12 may be returned to lap position, in which the supply of fluid under pressure through the passage 131a to the pipe 131 is cut off, so that the fluid pressure in the pipe 131 is quickly reduced by flow of fluid through the restricted atmospheric port 202. The suppression switch device 14 is thus permitted to return to circuit-opening position. It will be understood, however, that by this time the traffic conditions are such as to cause automatic operation of the signal decoding equipment 20 to again supply energizing current to the timing relay magnet 109, so that the contact member 108 is again shifted to the circuit-closing position and the magnet valve device 16 thereby maintained in its normal position as shown in Fig. 1.

If it is desired to operate the vehicle having the equipment shown in Figs. 1 and 2 of the drawings as a trailer car in a train to be controlled from another leading car, both brake valve devices and the train control equipment on that trailer car may be put out of operation in the following manner. Assuming that the vehicle is about to be coupled into the train, the brake valve device 12 at the forward end of the car is first moved to service position, so that the suppression switch 14 is moved to circuit-closing position while the cut-out delay reservoir 160 is charged with fluid under pressure in the manner already explained, after which the cut-out valve device 13 may be moved from the cut-in position shown in Fig. 1 to cut-out position. The brake valve device 12 is then moved to lap position. With the cut-out valve device 13 in cut-out position, the pipe 141 is connected to the atmosphere by way of the passage 169 in the rotary valve 50, as shown in Fig. 4, so that fluid under pressure is vented from the diaphragm casing 104 in the directional relay device 17, while the contact member 100 is thereby permitted to assume an intermediate position in which it is out of contact with either of the contact elements 102. It will thus be apparent that with the directional relay device 17 in this position, the circuit, through the medium of which the magnet of the magnet valve device 16 might otherwise be energized, is maintained open.

Meanwhile, the cut-out delay reservoir 160 has been connected through the passage 164 with the pipe 94, so that the portion of the pipe 94 to the left of the check valve 95 as viewed in Fig. 1 has become charged with fluid under pressure, initially by flow of fluid from the cut-out delay reservoir 160, and then by continued supply of fluid under pressure from the rotary valve chamber 48. As a result, when the valve 97 of the magnet valve device 16 is unseated on deenergization of the magnet, appreciable flow of fluid under pressure from the piston chamber 60 in the application valve device 11 past the unseated valve is prevented, and the application piston 59 and slide valve 62 are thus held in the normal position as shown in Fig. 1 of the drawings.

At the same time, with the cut-off valve device 13 shown in Fig. 1 in cut-out position, fluid under pressure is supplied from the rotary valve chamber 48 through the passage 167 in the rotary valve, as shown in Fig. 4, to the pipe and passage 77, and acts within the chamber 76 against the valve piston 69 in the application valve device 11 for causing the valve piston to cut-off communication between the chambers 73 and 68, so that the pressure of fluid in the brake pipe 5 can no longer be controlled through the medium of the brake valve device 12. With the brake valve devices 12 at both ends of the vehicle, together with the train control apparatus, thus rendered inoperative, the vehicle is ready to be coupled to the adjacent cars of the train, the fluid pressure brakes on said vehicle being thereafter controllable according to variations in the pressure in the brake pipe 5 as effected by the usual operation of the brake valve device on the leading vehicle.

When the car equipped with the apparatus shown in Figs. 1 and 2 is to be operated as a separate traction vehicle on track not included in the train control zone, the equipment may be initially put in the fully charged condition as shown in the drawings and hereinbefore explained, with the brake valve device 12 and cut-out valve device 13 at the head end of the vehicle adapted for controlling the fluid pressure brakes, the cut-out valve device 13 and the brake valve device 12 at the rear of the vehicle being left in cut-out and lap positions, respectively, as shown in Fig. 2 of the drawings.

While the vehicle is being operated outside of the train control zone, the signal decoding and speed control equipment 20 functions to maintain the magnet 109 of the timing relay device 18 constantly energized so that the contact member 108 is held in circuit-closing position. With the directional relay device 17 also maintained in circuit-closing position due to the pressure of fluid in the diaphragm casing 104 supplied by way of the cut-out valve device 13 in Fig. 1, it will be apparent that the magnet in the magnet valve device 16 will also be maintained energized, thereby normally preventing the train control apparatus from affecting the usual control of the brakes by the motorman.

If the motorman should now desire to control the vehicle from the opposite end, he may do so without casing operation of the train control apparatus to effect an emergency application of the brakes provided he first moves the brake valve device 12 shown in Fig. 1 to service position to effect a service application. With the brake valve device 12 in service position, fluid under pressure is supplied in the manner already described to the cut-out delay reservoir 160. The cut-out valve device 13 may then be moved to cut-out position, wherein the cut-out delay reservoir 160 is connected to the pipe 94 leading to the check valve 95, while fluid under pressure is vented from the diaphragm casing 104 in the directional relay device 17 for causing said device to assume circuit opening position. With the pipe 94 thus initially charged with fluid under pressure, fluid under pressure cannot escape from the piston chamber 16 in the application valve device 11, which is thereby prevented from operating.

When a service application of the brakes has thus been effected, the motorman may move the brake valve device 12 to lap position, after which he may remove the handle 27 from the brake valve device and the handle 51 from the cut-off valve device 13, which handles he then carries to the opposite end of the car and applies to the brake valve device 12 and cut-out valve device 13 shown in Fig. 2 of the drawings. In order to render the brake valve device 12 operable for controlling the brakes, the operator next moves the cut-out valve device 13 to cut-in position. As shown in Fig. 4 of the drawings, with the cut-out valve device 13 in cut-in position, fluid under pressure is supplied from the pipe 49 through valve chamber 48, valve passage 140 and pipe 141a to the diaphragm casing 105 of the directional relay device 17 shown in Fig. 1 of the drawings, and the rod 103 is then operated to move the contact member 100 toward the left into contact with the element 102. When the directional relay device 17 has thus been moved into circuit-closing position, the magnet in the magnet valve device 16 is again energized for moving the valve 97 into seated position.

A few seconds may be required for the above operation of the directional relay device 17 and magnet valve device 16, but it will be understood that appreciable venting of fluid under pressure from the application piston chamber 16 in the application valve device 11 past the valve 97 prior to the seating thereof will have meanwhile been prevented, due to the fact that, although the pipe 94 shown in Fig. 2 now communicates with the atmospheric port 152, the initially charged cut-in delay reservoir 156 is also connected through the rotary valve passage 151 to the pipe 94, the fluid under pressure in said pipe and reservoir being permitted to escape to atmosphere only at a slow rate as determined by the restricted portion 153 of the rotary valve passage. In other words, fluid pressure is maintained in the pipe 94 and acts against the check valve 95a for preventing escape of fluid therepast from the pipe 93 for a predetermined interval following the movement of the cut-out valve 13 shown in Fig. 2 to cut-in position, this interval of time being sufficient to permit operation of the directional relay device 17 to circuit-closing position, so that undesired operation of the application valve device 11 is suppressed.

With the cut-out valve device 13 shown in Fig. 2 in cut-in position, the pipe 86 is connected through the valve passage 151 to the atmospheric exhaust port 152, so that the chamber 85 within the application valve device 11 is vented to the atmosphere by way of the passage 86 and pipe 86. When the brake valve device 12 is subsequently moved to release position for supplying fluid at feed valve pressure through the passage 34 and pipe and passage 82 to the chamber 81 in the application valve device 11, the valve piston 70 is thereby shifted upwardly and away from the seat 80 for establishing communication from the chamber 81 to the chamber 68. The pressure of fluid in the brake pipe 5 may thereafter be controlled in accordance with operation of the brake valve device 12 shown in Fig. 2 of the drawings.

It will thus be seen that the operator may shift his position from one end of the vehicle to the other and retain control of the brakes without the undesired operation of the automatic train control apparatus, provided a service application of the brakes has first been effected. If, however, the operator should attempt to change ends without first effecting a service application of the brakes, the train control apparatus becomes operative to cause an emergency application of the brakes. In the event that, while the equipment is in the condition shown in Figs. 1 and 2 of the drawings, the operator should move the cut-out valve device 13 from the cut-in position shown in Fig. 1 to cut-out position without first having moved the brake valve device 12 to service position long enough to charge the cut-out delay reservoir 160 with fluid under pressure, the pipe 94 will be connected to the pipe 159 and the still vented reservoir 160. Since the magnet valve device 16 will be deenergized and the valve 97 unseated at the same time, fluid under pressure will thus be vented from the application piston chamber 60 to the cut-out delay reservoir 160 shown in Fig. 1, and the application piston 59 and slide valve 62 will consequently be operated to effect an emergency application of the brakes.

From the foregoing description of my invention, it will be understood that the automatic train control and brake equipment constructed in accordance therewith is particularly desirable for use on vehicles operating at one time as units in a train under track signal control, and at another time as separate transit vehicles. The train control equipment is so designed that, when a number of the vehicles provided therewith are coupled together and operated in a train control zone, the fluid pressure brakes on all cars are controllable from the leading car, the train control apparatus on which is operative to effect an emergency application of the brakes if the operator fails to exercise the desired control of the brakes in response to an adverse traffic signal, while the train control apparatus and brake valve on the trailing cars are maintained inoperative. It will also be apparent that, according to the invention, when a vehicle having this equipment is operated independently and outside of the train control zone, the train control apparatus will function to insure that an application of the brakes will be effected before the operator can change control of the brakes from one end of the vehicle to the other.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In an automatic train control and brake equipment for a vehicle, in combination, a brake valve device at each end of the vehicle, an application valve device operable upon a reduction in fluid pressure for effecting an application of the brakes, a magnet valve device operable in response to an adverse signal indication for venting fluid under pressure from said application valve device, and manually controlled means associated with each brake valve device at opposite ends of the vehicle and adapted to be conditioned, in response to movement of the adjacent brake valve device for effecting an application of the brakes, for operation to close communication through which fluid under pressure is vented from said application valve device by operation of said magnet valve device.

2. In an automatic train control and brake equipment, in combination, an application valve device operative upon a reduction in fluid pressure for effecting an application of the brakes, a magnet valve device operative in response to an adverse signal indication for venting fluid under pressure from said application valve device, valve means disposed adjacent said magnet valve device and operable by fluid under pressure for closing communication through which said magnet valve device vents fluid under pressure, and manually controlled means operable to establish communication past said valve means through which fluid under pressure is vented by said magnet valve device and also operable to supply fluid under pressure to said valve means.

3. In an automatic train and brake equipment, in combination, a brake pipe, an application valve device operative upon a reduction in fluid pressure for venting fluid under pressure from said brake pipe to effect an application of the brakes, a magnet valve device operative in response to an adverse signal indication for venting fluid under pressure from said application valve device, valve means disposed adjacent said magnet valve device and operative by fluid under pressure for closing communication through which said magnet valve device vents fluid under pressure, and manually controlled means operable to establish communication past said valve means through which fluid under pressure is vented by said magnet valve device and also operable to supply fluid under pressure to said valve means.

4. In an automatic train control and brake equipment, in combination, a brake valve device, an application valve device automatically operative to effect an application of the brakes, a normally vented reservoir adapted to be charged with fluid under pressure on movement of the brake valve to effect application of the brakes, and a cut-out valve device manually operable when the reservoir is vented to cause operation of said application valve device, and also operable after the reservoir has been charged with fluid under pressure for preventing operation of said application valve device.

5. In an automatic train control and brake equipment, in combination, a brake pipe, a reduction in fluid pressure in which is effective to cause an application of the brakes, a brake valve device normally communicating with said brake pipe, an application valve device automatically operative to vent fluid under pressure from said brake pipe for effecting an application of the brakes, a cut-out valve device manually operable to close communication from the brake valve device to the brake pipe, safety means for causing operation of said application valve device on initial movement of said cut-out valve device to cut-out position, and means conditioned on movement of said brake valve device to an application position for rendering said application valve device inoperable by the safety means.

6. In an automatic train control and brake equipment, in combination, a brake pipe, a reduction in fluid pressure in which is effective to cause an application of the brakes, a brake valve device normally communicating with said brake pipe, an application valve device automatically operative to vent fluid under pressure from said brake pipe for effecting an application of the brake, a cut-out valve device manually operable to cut off communication from the brake valve device to the brake pipe, means for causing operation of said application valve device on initial movement of said cut-out valve device to cut-out position, and means rendered effective, during operation of said brake valve device to effect an application of the brakes, for preventing operation of the application valve device regardless of subsequent movement of said cut-out valve device.

7. In an automatic train control and fluid pressure brake equipment, in combination, a normally charged brake pipe, a train control application valve device operative on reduction in the fluid pressure in a chamber to vent fluid under pressure from said brake pipe for effecting an application of the brakes, an electromagnet valve device normally energized by current in a train control circuit and operative when deenergized in response to an adverse signal indication to connect said chamber to a vent communication, a suppression switch operable to close another circuit for maintaining said magnet valve device energized, valve means adapted to be conditioned for operation to check flow of fluid under pressure through said vent communication, and manually controlled means operable for first effecting operation of said switch while conditioning said valve means for subsequent operation.

8. In an automatic train control and fluid pressure brake equipment, in combination, a normally charged brake pipe, a brake valve device operable to vent fluid under pressure from the brake pipe for effecting an application of the brakes, a train control application valve device operative on reduction of fluid pressure in a chamber to cause venting of fluid under pressure from said brake pipe, a normally energized electromagnet valve device operative when deenergized in response to an adverse signal indication to connect said chamber to a vent communication, a suppression switch device controlling an independent circuit for said electromagnet device and operative while said brake valve device is in a brake application position to maintain said magnet valve device energized regardless of signal indications, and manually operable valve means normally connecting said vent communication to atmosphere and rendered operable during operation of said switch device for closing said vent communication.

9. In a train control and brake equipment, a brake valve device operable to effect an application of the brakes, train control apparatus automatically operative in response to an adverse control signal for effecting an application of the brakes, suppression means operative when said brake valve device is in a brake application position to suppress operation of said train control apparatus, a cut-out valve device adapted to be operated subsequently to movement of the brake valve device for rendering said train control apparatus ineffective to cause an application, and means associated with said brake valve device and cut-out valve device for causing automatic operation of said train control apparatus in the event of movement of said cut-out valve device before said brake valve device has been operated.

10. In a fluid pressure brake and train control equipment, in combination, a brake valve device normally operable to effect an application of the brakes, an application valve device operative on reduction in fluid pressure in a chamber for causing an automatic application of the brakes, a magnet valve device operative in response to an adverse control signal indication for establishing communication from said chamber to a vent passage, suppression means operative on movement of said brake valve device to a brake application position to suppress operation of said magnet valve device, a normally vented reservoir adapted to be charged with fluid under pressure when said brake valve device is in application position, and a cut-out valve device normally connecting said vent passage to atmosphere and operable to connect said reservoir to said passage, whereby operation of said application valve device may be prevented by initially operating the brake valve device and then operating said cut-out valve device for causing the fluid pressure in the reservoir to oppose flow of fluid under pressure from said chamber by way of said vent passage.

11. In a fluid pressure brake and automatic train control equipment for a vehicle, in combination, a brake pipe, fluid pressure brake means operative according to variations in brake pipe pressure to apply and release the brakes, application valve means automatically operative on reduction in the pressure of fluid in a chamber to vent fluid under pressure from said brake pipe, a magnet valve device operative in response to an adverse signal indication to establish communication from said chamber to a vent passage, a normally vented reservoir, a brake valve device normally operable to control the supply and release of fluid under pressure to and from said brake pipe and adapted when moved to brake application position to supply fluid under pressure to said reservoir, suppression means operative when said brake valve device is in application position for preventing operation of said magnet valve device, and a cut-out valve device having one position for connecting said vent passage to atmosphere and movable to another position for connecting said reservoir to said vent passage while rendering said brake valve device ineffective to vary the pressure in said brake pipe.

12. In a fluid pressure brake and train control equipment for a vehicle, in combination, a normally charged brake pipe, a reduction in pressure in which is adapted to effect an application of the brakes, train control mechanism automatically operative in response to an adverse signal indication to vent fluid under pressure from the brake pipe, a pair of brake valve devices, one at each end of the vehicle, for controlling the supply and release of fluid under pressure to and from the brake pipe, cut-out valve devices associated with said brake valves and operable to cut off communication from the brake pipe thereto, and means operative when both said cut-out devices are positioned to cut out said brake valves for rendering said train control mechanism ineffective to control the brakes.

13. In a fluid pressure brake and train control equipment for a vehicle, in combination, a normally charged brake pipe, a reduction in pressure in which is adapted to effect an application of the brakes, train control mechanism automatically operative in response to an adverse signal indication to vent fluid under pressure from the brake pipe, a pair of brake valve devices, one at each end of the vehicle, for controlling the supply and release of fluid under pressure to and from the brake pipe, cut-out valve devices associated with said brake valves and operable to cut off communication from the brake pipe thereto, means operative when both said cut-out valve devices are positioned to cut out said brake valves for rendering the train control mechanism ineffective to control the brakes, and means operative on movement of either of said cut-out valve devices for causing an automatic application of the brakes unless a predetermined application has previously been effected.

14. In a fluid pressure brake and train control equipment for a vehicle adapted to be controlled from either end, in combination, a brake pipe, brake means operative on a reduction in brake pipe pressure to effect an application of the brakes, a brake valve device at each end of the vehicle, train control application means operative in response to an adverse signal indication to vent fluid from the brake pipe, suppression means associated with each brake valve device and operative therewith to prevent operation of said application valve means, and means for rendering at least one of said brake valve devices ineffective to control the brakes.

15. In a fluid pressure brake and train control equipment for a vehicle adapted to be controlled from either end, in combination, a brake pipe, brake means operative on a reduction in brake pipe pressure to effect an application of the brakes, a brake valve device at each end of the vehicle, train control application means operative in response to an adverse signal indication to vent fluid from the brake pipe, suppression means associated with each brake valve device and cooperative therewith to prevent operation of said application valve means, and means operable for rendering both said brake valve devices and said application valve device ineffective to control the pressure of fluid in said brake pipe.

16. In a fluid pressure brake and train control equipment for a vehicle adapted to be controlled from either end, in combination, a brake pipe, brake means operative on a reduction in brake pipe pressure to effect an application of the brakes, a brake valve device at each end of the vehicle, train control application means operative in response to an adverse signal indication to vent fluid from the brake pipe, suppression means associated with each brake valve device and cooperative therewith to prevent operation of said application valve means, and valve means operable under one condition for cutting off communication between the brake pipe and one of said brake valve devices, and under another condition for rendering both said brake valve devices and said application valve device ineffective to control the pressure of fluid in said brake pipe.

17. In a fluid pressure brake and train control equipment for a vehicle adapted to be controlled from either end, in combination, a brake pipe, brake means operative on a reduction in brake pipe pressure to effect an application of the brakes, a brake valve device at each end of the vehicle, train control application means operative in response to an adverse signal indication to vent fluid from the brake pipe, suppression means associated with each brake valve device and cooperative therewith to prevent operation of said application valve means, cut-out valve means operable to cut off communication between the brake pipe and at least one of said brake valve devices, and means for causing operation of said application valve means on operation of said cut-out valve means unless a predetermined reduction in brake pipe pressure has previously been effected.

18. In a fluid pressure brake and train control equipment for a vehicle, in combination, a brake pipe, a brake valve at each end of the vehicle, application valve mechanism operative on reduction in fluid pressure in a chamber to effect an application of the brakes, a magnet valve device operative to control communication from said chamber to a vent passage having two branch communications, a check valve in each of said branch communications, cut-out valves each of which controls communication from the brake pipe to one of said brake valve devices, and valve means at each end of the vehicle manually movable to a cut-out position for operating the corresponding cut-out valve, said valve means being operative in cut-out position to supply fluid under pressure to one of said branch communications for opposing flow of fluid from said chamber past the check valve in that communication, whereby when both said valve means are in cut-out position, said brake valve devices and said application valve mechanism are rendered ineffective to control the pressure of fluid in the brake pipe.

19. In an automatic train control equipment, in combination, an application valve device operative on reduction in the pressure of fluid in a chamber for effecting an application of the brakes, an electromagnet valve device operative when deenergized to establish communication from said chamber to a vent passage, means for normally maintaining said electromagnet valve device energized, fluid pressure responsive relay means operative on a reduction in fluid pressure to open the circuit through which said magnet is energized, and a cut-out valve device operative in a cut-out position to exhaust fluid under pressure from said relay means while supplying fluid under pressure to said vent passage, said cut-out valve device being operative from cut-out position to a cut-in position to supply fluid under pressure to said relay means and to establish communication from said vent passage to atmosphere through a restricted port, the back pressure of fluid previously supplied to said passage being thereby utilized to check possible flow of fluid from said chamber prior to the operation of said magnet valve device to cut off communication between the chamber and vent passage.

20. In an automatic train control and brake equipment of the class including a brake valve device, an application valve device operable upon reduction in pressure of fluid in a chamber for effecting an application of the brakes, and means automatically operative in response to a change in traffic conditions for establishing communication from said chamber to an atmospheric vent passage, in combination, a normally vented reservoir adapted to be charged with fluid under pressure upon operation of said brake valve device to a brake application position, and manually controlled valve means interposed in said atmospheric vent passage and adapted to be operated after said operation of the brake valve device to cut off the atmospheric communication from said vent passage and to establish communication thereto from said reservoir.

21. In an automatic train control and brake equipment of the class including a brake valve device, an application valve device operable upon reduction in pressure of fluid in a chamber for effecting an application of the brakes, and a magnet valve device operative in response to variation of current in a signal circuit for establishing communication from said chamber to an atmospheric vent passage, in combination, fluid pressure responsive circuit control means operable upon a reduction in fluid pressure to vary the current in said signal circuit, a manually controlled valve device having a cut-in position for maintaining supply of fluid under pressure to said circuit control means and a cut-out position for effecting a reduction of the fluid pressure acting on said circuit control means, and means interlocking said brake valve device and said manually controlled valve device and responsive to operation of said brake valve device in brake application position to condition said manually controlled valve device for subsequent movement to cut-out position for preventing discharge of fluid under pressure from said chamber regardless of operation of said magnet valve device.

ELLIS E. HEWITT.

CERTIFICATE OF CORRECTION.

Patent No. 2,173,941. September 26, 1939.

ELLIS E. HEWITT.

It is hereby certified that error appears in the above numbered patent requiring correction as follows: In the heading to the drawings, Sheets 1 and 2, name of inventor, for "E. E. HEWITT ET AL" read E. E. HEWITT; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.